UNITED STATES PATENT OFFICE.

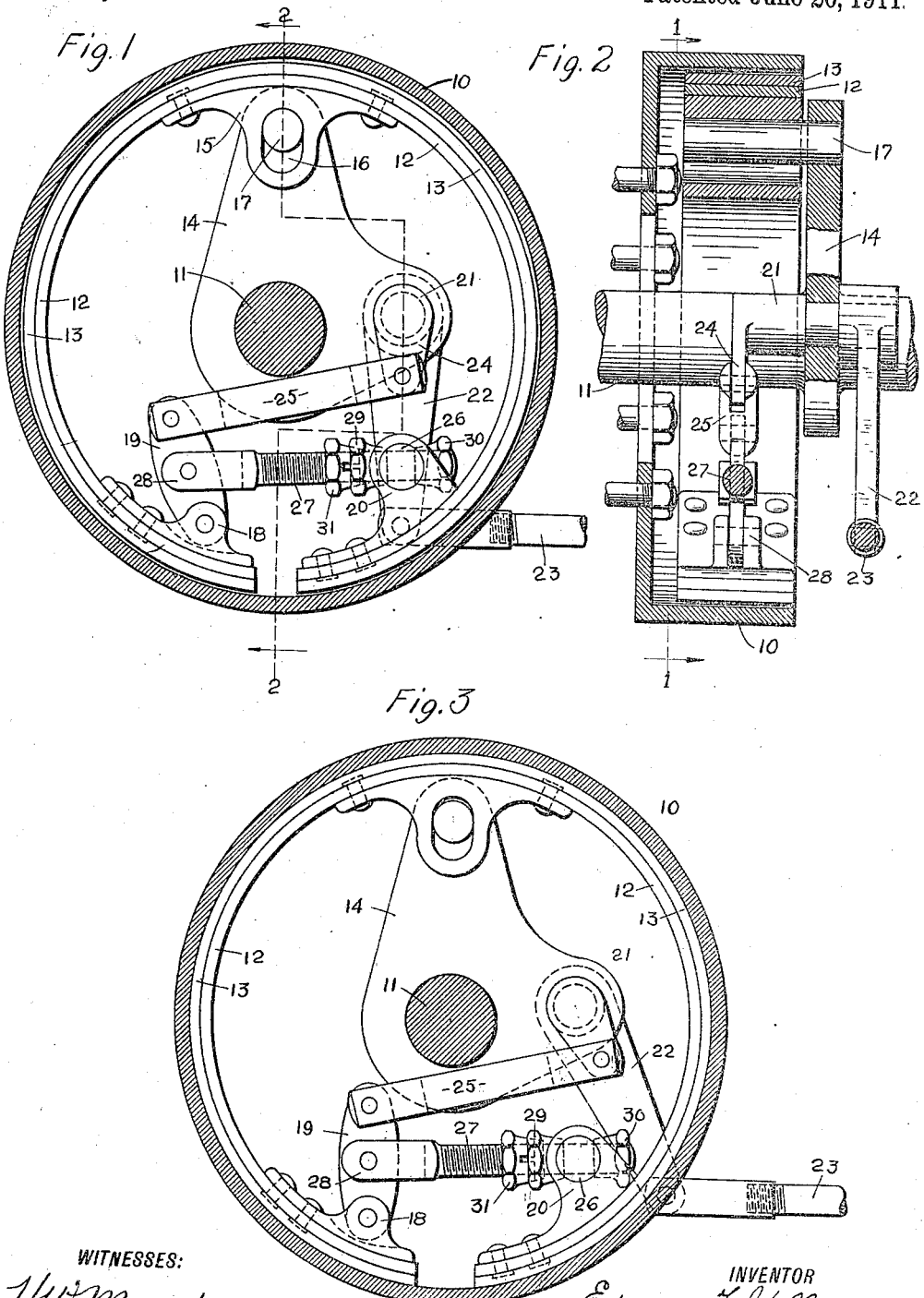

EDWARD F. KELLEY, OF BRIDGEPORT, CONNECTICUT, ASSIGNOR TO THE ROYAL EQUIPMENT COMPANY, OF BRIDGEPORT, CONNECTICUT, A CORPORATION OF CONNECTICUT.

EXPANDING BRAKE.

995,606.  Specification of Letters Patent.  Patented June 20, 1911.

Application filed June 20, 1910. Serial No. 567,773.

*To all whom it may concern:*

Be it known that I, EDWARD F. KELLEY, a citizen of the United States, residing at Bridgeport, county of Fairfield, State of Connecticut, have invented an Improvement in Expanding Brakes, of which the following is a specification.

This invention has for its object to provide an internal expanding brake adapted for general use upon machinery and vehicles and especially adapted for use upon motor cars in which the braking effect shall be relatively great in comparison with the operating force and will be equally efficient in either direction of rotation of the drum. With this and other objects in view I have devised the novel expanding brake which I will now describe, referring to the accompanying drawing forming a part of this specification and using reference characters to indicate the several parts.

Figure 1 is an elevation of my novel brake in its normal or inoperative position, the drum being in section on the line 1—1 in Fig. 2, looking in the direction of the arrows; Fig. 2 a section on the line 2—2 in Fig. 1, looking in the direction of the arrows; and Fig. 3 is a view corresponding with Fig. 1, showing the brake in its operative or holding position.

10 denotes the drum which is rotary, 11 an axle which is non-rotary, 12 the brake band and 13 the brake facing or pad. The brake pad lies in proximity to the inner periphery of the drum and is secured to and retained in place by the brake band. The brake and the operating mechanism therefor are supported by means of an anchor plate 14 which is rigidly secured to the axle. 15 denotes a stay piece which is rigidly secured to the brake band on its inner periphery on the upper side. This stay piece is provided with an elongated opening 16 which is engaged by a stud 17 which extends from the anchor plate.

18 denotes ears rigidly secured to one end of the brake band, the left end as seen in Figs. 1 and 3, to which a lever 19 is pivoted. 20 denotes ears rigidly secured to the opposite end of the brake band, the right end as shown in Figs. 1 and 3, 21 a rock shaft mounted to oscillate in the anchor plate which is made relatively heavy and is suitably shaped to meet the requirements of use, 22 an operating arm which extends from the rock shaft and 23 an operating rod pivoted to the operating arm. 24 denotes an arm extending from the opposite end of the rock shaft, 25 an operating link pivoted to said arm and to the free end of lever 19, 26 a hub which is mounted in ears 20, and 27 a threaded adjusting rod which passes freely through a transverse hole in said hub and is provided at its opposite end with a yoke 28 which is pivoted to lever 19 at approximately its mid length. The adjustment of the brake is effected by means of nuts 29 and 30 which engage the adjusting rod on opposite sides of the hub. 31 is a set nut on said rod by which the parts are locked in position after adjustment. Should the brake pad become worn in use, the wear is taken up by means of the nuts on the adjusting rod so as to give the pad effective contact with the inner periphery of the drum.

The operation is as follows: A pull upon the operating rod oscillates the rock shaft and by means of the link swings lever 19 from the inoperative position, as in Fig. 1, to the operative position, as in Fig. 3. The effect of this movement is by means of ears 15 to crowd the left end of the brake band, as seen in Figs. 1 and 3, outward, that is toward the left. Simultaneously, by means of the adjusting bolt, hub 26 and ears 20, the right end of the brake band is also crowded outward, that is toward the right, as shown in Figs. 1 and 3. The effect of this movement upon the brake band as a whole is to expand the entire band and cause the entire brake pad to bear forcibly upon the inner periphery of the drum, stay piece 15 rising away from stud 17, as clearly shown in Fig. 3. As soon as the pull upon the operating rod is relieved, the brake band, carrying the pad with it, contracts to its normal position, as in Fig. 1, stay piece 15 resting upon the stud which supports the band and the pad. It will be obvious that it is wholly immaterial in which direction the drum is rotating, as the operation of the brake is wholly independent of the direction of rotation of the drum.

Having thus described my invention I claim:

1. A brake of the character described comprising a band adapted to engage the inner periphery of a drum, and provided with a stay piece by which it is retained in place, a lever having one end pivotally connected with one end of said band, an operating link pivoted to the other end of said lever, a hub connected with the other end of said band, a rod pivoted at one end to said lever, the other end extending transversely through said hub, means for adjustably connecting said rod and said hub, and means for actuating said link.

2. A brake of the character described comprising a band adapted to engage the inner periphery of a drum, and provided with a stay piece by which it is retained in place, a lever having one end pivotally connected with one end of said band, an operating link pivoted to the other end of said lever, a hub carried by the other end of said band, a rod pivoted to said lever at a point between the ends of the latter and having a threaded portion extending transversely through said hub, nuts working on the threaded portion of said rod and located on opposite sides of the hub, and means for actuating said link.

3. A brake comprising a stationary anchor plate, a band adapted to engage a drum and provided with a stay piece connected to said anchor plate, a lever having one end pivotally connected with one end of the band, an operating link pivoted to the other end of said lever, means carried by said anchor plate for actuating said link, a hub carried by the other end of said band, a rod pivoted at one end to said lever the other end being extended transversely through said hub, and means for adjustably connecting said rod and hub.

4. A brake comprising a stationary anchor plate, a band adapted to engage a drum and provided with a stay piece connected to said anchor plate, a lever pivoted to one end of the band, an operating link pivoted to said lever, means carried by said anchor plate for actuating said link, and a rod arranged substantially parallel with said link and connecting said lever with the other end of said band, and means for adjusting said rod.

5. A brake of the character described comprising a band adapted to engage the inner periphery of a drum and provided with a stay piece having an elongated opening, a stationary anchor plate having a stud engaging said opening to support said band, a lever having one end pivotally connected with one end of said band, an operating link pivoted to the other end of said lever, a rod pivoted to said lever at a point between the ends of the latter and connected with the other end of said band, and means for actuating said link.

6. A brake of the character described comprising a band adapted to engage the inner periphery of a drum and provided with a stay piece having an elongated opening, a stationary anchor plate having a stud engaging said opening to support said band, a lever having one end pivotally connected with one end of said band, an operating link pivoted to the other end of said lever, a hub carried by the other end of said band, a rod pivoted to said lever at a point between the ends of the latter and having a threaded portion extending transversely through said hub, nuts working on the threaded portion of said rod and located on opposite sides of the hub, and means for actuating said link.

In testimony whereof I affix my signature in presence of two witnesses.

EDWARD F. KELLEY.

Witnesses:
A. M. WOOSTER,
S. W. ATHERTON.